United States Patent [19]
Martin, Jr. et al.

[11] Patent Number: 6,045,115
[45] Date of Patent: Apr. 4, 2000

[54] FAIL-SAFE DELIVERY ARRANGEMENT FOR PRESSURIZED CONTAINERS

[75] Inventors: Thomas B Martin, Jr., Placerville; David A. Le Febre, Camino, both of Calif.

[73] Assignee: UOP LLC, Des Plaines, Ill.

[21] Appl. No.: 09/111,838

[22] Filed: Apr. 17, 1998

[51] Int. Cl.[7] .................................................. F16K 31/365
[52] U.S. Cl. .......................... 251/118; 251/335.3; 138/44
[58] Field of Search ..................... 251/118, 123, 251/335.3; 137/494, 495, 906, 613; 138/44

[56] References Cited

U.S. PATENT DOCUMENTS

| | | |
|---|---|---|
| 2,666,297 | 1/1954 | Skousgaard .......................... 251/123 X |
| 4,723,967 | 2/1988 | Tom . |
| 4,738,693 | 4/1988 | Tom . |
| 4,744,221 | 5/1988 | Knollmueller . |
| 5,156,827 | 10/1992 | Tom et al. . |
| 5,392,815 | 2/1995 | Stuart ..................................... 138/44 X |
| 5,518,528 | 5/1996 | Tom et al. . |
| 5,704,965 | 1/1998 | Tom et al. . |
| 5,704,967 | 1/1998 | Tom et al. . |
| 5,707,424 | 1/1998 | Tom et al. . |
| 5,820,102 | 10/1998 | Borland ................................ 251/118 X |
| 5,937,895 | 8/1999 | Le Febre et al. .................... 251/118 X |

*Primary Examiner*—Kevin Lee
*Attorney, Agent, or Firm*—Thomas K. McBride; John G. Tolomei

[57] ABSTRACT

The present invention uses a flow restrictor to provide a capillary size opening that minimizes any discharge of toxic gases from compressed gas cylinders in the unlikely event of the control valve or regulator failure. The use of this arrangement to provide a flow restriction in combination with a regulator in the form of a dispensing check valve provides a virtually fail safe system for preventing hazardous discharge of fluid from a pressurized cylinder or tank. A capillary tube or other structure can provide capillary size openings that minimizes any discharge of gas in the unlikely event of a failure of the regulator. Location of the inlet to the capillary tube at the midpoint of the cylinder can also prevent the discharge of liquid from the cylinder if the control valve system fails. Limiting the accidental discharge of fluid from the cylinder to gas phase fluids greatly reduces the uncontrolled mass flow rate at which fluid can escape from the cylinder. A diaphragm controls the movement of a check valve element to prevent discharge of gas from a tank unless a predetermined vacuum condition exists downstream of the check valve. This system is particularly useful in the delivery of arsine gas and provides multiple safeguards against accidental discharge.

20 Claims, 3 Drawing Sheets

FAIL-SAFE DELIVERY ARRANGEMENT FOR PRESSURIZED CONTAINERS

FIELD OF THE INVENTION

This invention relates to the delivery of gases or liquids from storage containers such as pressurized tanks or cylinders. More specifically this invention relates to preventing uncontrolled discharge of gases from such containers.

BACKGROUND OF THE INVENTION

Many industrial processing and manufacturing applications require the use of highly toxic fluids. The manufacture of semiconductor materials represents one such application wherein the safe storage and handling of highly toxic hydridic or halidic gases becomes necessary. Examples of such gases include silane, germane, ammonia, phosphine, arsine, stibine, hydrogen sulfide, hydrogen selenide, hydrogen telluride, and other halide compounds. As a result of toxicity and safety considerations, these gases must be carefully stored and handled in the industrial process facility. The semiconductor industry in particular relies on the gaseous hydrides of arsine ($AsH_3$) and phosphine ($PH_3$) as sources of arsenic (As) and phosphorus (P) in ion implantation. Ion implantation systems typically use dilute mixtures of $AsH_3$ and $PH_3$ at pressures as high as 1500 psig. Due to their extreme toxicity and high vapor pressure, their use, transportation and storage raise significant safety concerns for the semiconductor industry.

Looking at Arsine handling as a more specific example of how an extremely toxic gas is used by the semiconductor industry, arsine is typically stored in pressurized containers at about 250 psi. The handling of arsine cylinders in production environments presents a wide variety of hazardous situations. A leak in one 140 gram cylinder of arsine could contaminate the entire volume of a 30,000 square foot building with 10 foot high ceilings to the Immediate Danger to Life and Health (IDLH) level. If the leak were large, this could happen in just a minute or two, which would mean that for many hours there would be extremely deadly concentrations in the area near the source of the spill.

An arsine container typically uses a 500 cc gas cylinder with a valve at one end. Liquid arsine pumped at about 250 psi fills the cylinder to about 20% of its capacity (about 140 grams of arsine). Once filled, the valve is closed and a safety cap is installed on the valve outlet port. The cylinder is light (about 5 pounds) and the valve is strong compared to the weight of the cylinder so that dropping the cylinder onto the valve end from 10 or 20 feet above a concrete floor will not breach the integrity of the valve or cylinder. This strength of these small cylinders eliminates the need for the valve protection that usually appears on larger gas cylinders.

An end-user that receives the container will, in a well ventilated area, remove the safety cap, install the container, usually vertically, on the end-use apparatus, and open the valve. The container then dispenses liquid or gas arsine depending on the position of the valve end. If the valve end is down, arsine liquid will be dispensed. If the valve end is up, arsine gas will be dispensed. Regardless of valve position, the end-user apparatus always uses arsine in gas phase whether discharged from the cylinder as a gas or converted from liquid to gas within the end-user apparatus.

The saturation pressure of liquid arsine at room temperature (22° C.) is about 250 psi. This means that any leak in the container to apparatus connections or in the end user apparatus itself will have arsine exiting to atmosphere at 250 psi. Thus, connections that remain absolutely leak tight to 250 psi or better must join all parts of the apparatus and supply container. If the end user were to first open the valve and then remove the safety plug, the entire 140 grams of arsine could spill out in as little as one or two seconds, especially if the valve end were down. Such an event could happen if someone turns the valve handle full open hard with enough torque such that the handle sticks sufficiently to mislead someone else into thinking that the valve was closed. Removal of the safety cap or disconnection of the cylinder under the mistaken belief that the valve was closed could then result in a rapid release of arsine.

In view of the serious potential for injury or death that could result from an unintended release of these fluids, the prior art discloses systems for preventing such catastrophic release of toxic fluids. One system, now in common use retains arsine or other highly toxic dopants on an adsorbent. For example, one system now in common use retains arsine or other highly toxic dopants on an adsorbent. For example, U.S. Pat. No. 4,744,221 teaches the storing and the subsequent delivery of arsine by contacting arsine at a temperature of from about −30° C. to about +30° C. with a zeolite to adsorb arsine on the zeolite for storage. Heating then dispenses the arsine from the zeolite at an elevated temperature of up to about 175° C. The method of the '221 patent imposes a disadvantageous heating requirement on the arsine delivery. One problem with heating is that the storage vessel typically has a significant heat capacity. The heat capacity of the storage vessel introduces a significant lag time in the dispensing operation. Further, heating can decompose the arsine resulting in the formation of hydrogen gas with its potential explosion hazards. Thermal decomposition of arsine also causes an undesired increase in gas pressure for the process system.

U.S. Pat. Nos. 5,704,965; 5,704,967; 5,707,424; and 5,518,528 teach systems for storage and dispensing of hydridic and halidic gases which operate at ambient temperature by using a pressure reduction to desorb toxic fluids from zeolite materials having high storage (sorptive) capacity for these gases. Looking closer at the '528 patent, it uses a dispensing assembly to provide a pressure below the interior pressure of the storage vessel. The reduced pressure desorbs the sorbate gas from the solid-phase physical sorbent medium. In order to retrieve a significant portion of the arsine off of the adsorbent, very low pressures must be used. When full, the dispensing pressure might be 600 torr. When half full, it will be down to about 70 torr. Most mass flow controllers are only rated down to 150 torr operating pressure. At 150 torr, 60% of the arsine on the adsorbent remains on the adsorbent. Some modifications to the equipment may be necessary to install the very low pressure mass flow controllers required for utilizing more than 40% of the arsine in an adsorbent type cylinder.

Arsine dispensing may also be controlled by in-situ generation of arsine on demand. U.S. Pat. No. 5,156,827 shows a system for generating arsinic or other dopants on demand from precursor compounds.

U.S. Pat. No. 4,936,877 teaches arsine delivery by dispersion into a carrier gas. In this system the arsine leaves a reservoir through a rate controlling membrane located in a mixing chamber that contacts the carrier gas with the arsine.

Valve lock arrangements provide more direct means of limiting the flow of liquid from carrier gas storage devices. U.S. Pat. No. 4,723,967 and 4,738,693 specifically disclose the use of membrane and diaphragm elements in a valve block that contains several multi-port valves to prevent liquid discharge in the delivery of dopines for the semiconductor industry.

It is a broad object of this invention to limit the release of toxic gases in the event of a valve or conduit failure.

Another object of this invention is to eliminate the need for sorbents to control the handling, storage and delivery of toxic fluids.

A yet further object of this invention is to provide a discharge system that constrains the flow of gas during normal operation as well as during any kind of valve mishandling or valve failure.

A specific object of this invention is to provide safeguards for the delivery of arsine.

SUMMARY OF THE INVENTION

The apparatus of this invention provides a flow restriction in the storage container that will positively limit the discharge of gas phase fluid from the container to a low mass flow rate. The mass flow rate is typically at or above the maximum desired flow rate at which the container must supply gas to the end use device, but yet restrictive enough to severely limit any accidental discharge rate. This invention can beneficially supply fluid in any application that consumes the fluid at a relatively low rate in relation to the unrestricted discharge rate from the cylinder. Any well known flow restriction device can serve as the flow restrictor. Suitable flow restriction devices can include, alone or in combination, packed conduits, membrane elements, or fine, porous screen or filter materials. A fine capillary tube can provide a preferred flow restriction where variations in both the length and diameter will allow adjustment of the maximum fluid discharge rate. Useful flow restrictions may have a location anywhere upstream of the container outlet or container valve outlet. Preferably the flow restriction has a location inside the cylinder or tank that supplies gas.

The discharge of liquids from the container poses a special hazard since the mass rate discharge of liquid will greatly exceed the mass rate discharge of the corresponding gas through the same restricted opening. Accordingly, the location of the inlet to the flow restrictor can aid in controlling fluid discharge. A particularly beneficial arrangement will locate the inlet to the flow restrictor in a manner that prevents liquid discharge from the container. In the case of arsine, the container is only filled to about 20% liquid by volume. Therefore, locating the inlet to the flow restrictor at the midpoint of the an arsine cylinder prevents the discharge of liquid arsine whether the cylinder is located upside down or right side up. Further, locating the inlet at the radial center of the cylinder will prevent liquid discharge for any vertical or horizontal position of the partially filled cylinder.

The most beneficial use of this invention incorporates the additional safeguard of a regulator that automatically limits the release of any toxic fluid delivered through the outlet of a storage container as claimed in copending application U.S. Ser. No. 09/062,599. The regulator uses a condition responsive valve element at or downstream of the storage container outlet to prevent discharge of fluid unless a suitable discharge condition exists outside of the container or is imposed on the pressure regulator. The discharge condition represents a predetermined condition that is highly unlikely to occur during storage or handling of the valve under normal handling and storage procedures and at normal atmospheric conditions. Such conditions may include heating of the regulator, or imposition of an electrical current, voltage potential, magnetic field or extraordinary mechanical forces on or about the regulator. Preferably the regulator will comprise a pressure sensitive element that will prevent discharge of fluid until a preselected pressure condition, or more preferably a vacuum condition, exists downstream of the regulator. As a further safeguard the discharge condition can be specially tailored to be supplied by the end use device such that the discharge condition cannot be imposed until the container is properly positioned within or about, and safely connected to, the end use device. In this manner the invention can provide a fail safe system for delivery of toxic fluids from storage containers. The regulator may have a location upstream or downstream of the container valve. For effectiveness the container valve or the container itself will house the regulator. A location upstream of the container valve offers the most protection to the regulator and its fail safe operation.

Accordingly, in a limited apparatus embodiment this invention is an apparatus for controlling the discharge of pressurized fluids from the outlet of a pressurized container. The apparatus comprises a port body for communication with the outlet of a pressurized container to define a fluid discharge path from the container. A pressure regulator fixed in or ahead of the port body contains a valve element adapted for movement between a sealing position that blocks fluid flow through the fluid discharge path and an open position that permits fluid flow along the fluid discharge path. A diaphragm defines an interior volume isolated from the pressure condition upstream of the port body and engaged with the valve element for controlling the movement of the valve element in a manner that retains the valve element in the sealing position until a pressure differential between the inside of the diaphragm relative to the pressure outside the diaphragm moves the valve element to the open position.

In a further limited apparatus embodiment this invention is a cylinder and a valve assembly for containing pressurized fluid and controlling the discharge of pressurized fluids from the cylinder. The cylinder and valve assembly comprises a cylinder defining a cylinder opening. The valve assembly includes a port body adapted for sealing engagement with the cylinder opening. A fluid inlet port is defined by the port body and communicates with the cylinder opening. A fluid outlet port is defined by the port body and located outside the cylinder. A fluid discharge path is defined by the valve body between the fluid inlet port and the fluid outlet port. A manually operated shut off valve controls fluid flow along the fluid discharge path. An automatic valve contains a valve element biased into a sealing position that blocks fluid flow along the fluid discharge path. A sealed bellows, located downstream of the valve element along the fluid discharge path, has one portion fixed with respect to the port body and another portion operably linked to the valve element to move the valve element from the sealing position to an open position when a relative pressure difference between the interior and exterior of the bellows expands the bellows.

In a broad embodiment this invention is a method and control system for discharging fluid from a tank and preventing uncontrolled discharge of fluid from the tank. The method comprises: filling a tank with a pressurized fluid; establishing a discharge path for controlled discharge from an outlet port in communication with the interior of the tank to a delivery port located outside the tank; blocking fluid flow across the discharge path by a control valve that responds to a thermal, mechanical, or pressure condition that is outside the range of normal atmospheric conditions; and imposing the necessary thermal, mechanical, or pressure condition on the control valve to selectively open the discharge path and release the pressurized fluid when desired.

Additional objects, embodiments, advantages, and details of the invention are described in the following detailed description of the preferred embodiments.

DETAILED DESCRIPTION OF THE PREFERRED EMBODIMENTS

Figure 1:
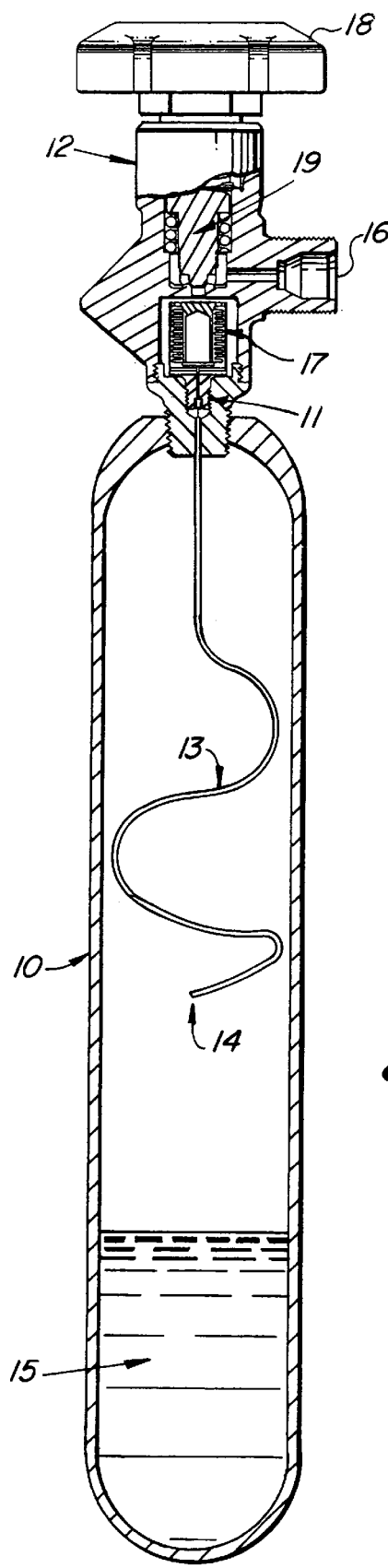
FIG. 1 is a cross-sectional view of a cylinder and head valve assembly incorporating the apparatus of this invention.

For purposes of explanation and not limitation this invention is further described in the context of the delivery of arsine gas. Looking then at FIG. 1, the invention in one form looks from the outside like a typical dispensing unit comprising a 500 cc cylinder 10 with cylinder head valve 12 at the top end and having a valve outlet 16. The interior or the cylinder contains a capillary tube 13 having an inlet 14 that supplies arsine gas to a valve inlet 11. Until exhausted, a liquid arsine reservoir 15 at the bottom of cylinder 10 replenishes the arsine gas as it leaves the cylinder and maintains the vapor pressure of the cylinder. A regulator 17, located in valve 12, contains a bellows assembly 28 that automatically controls the discharge of arsine gas from the cylinder. A handle 18 allows manual control of a main valve element 19.

Figure 2:
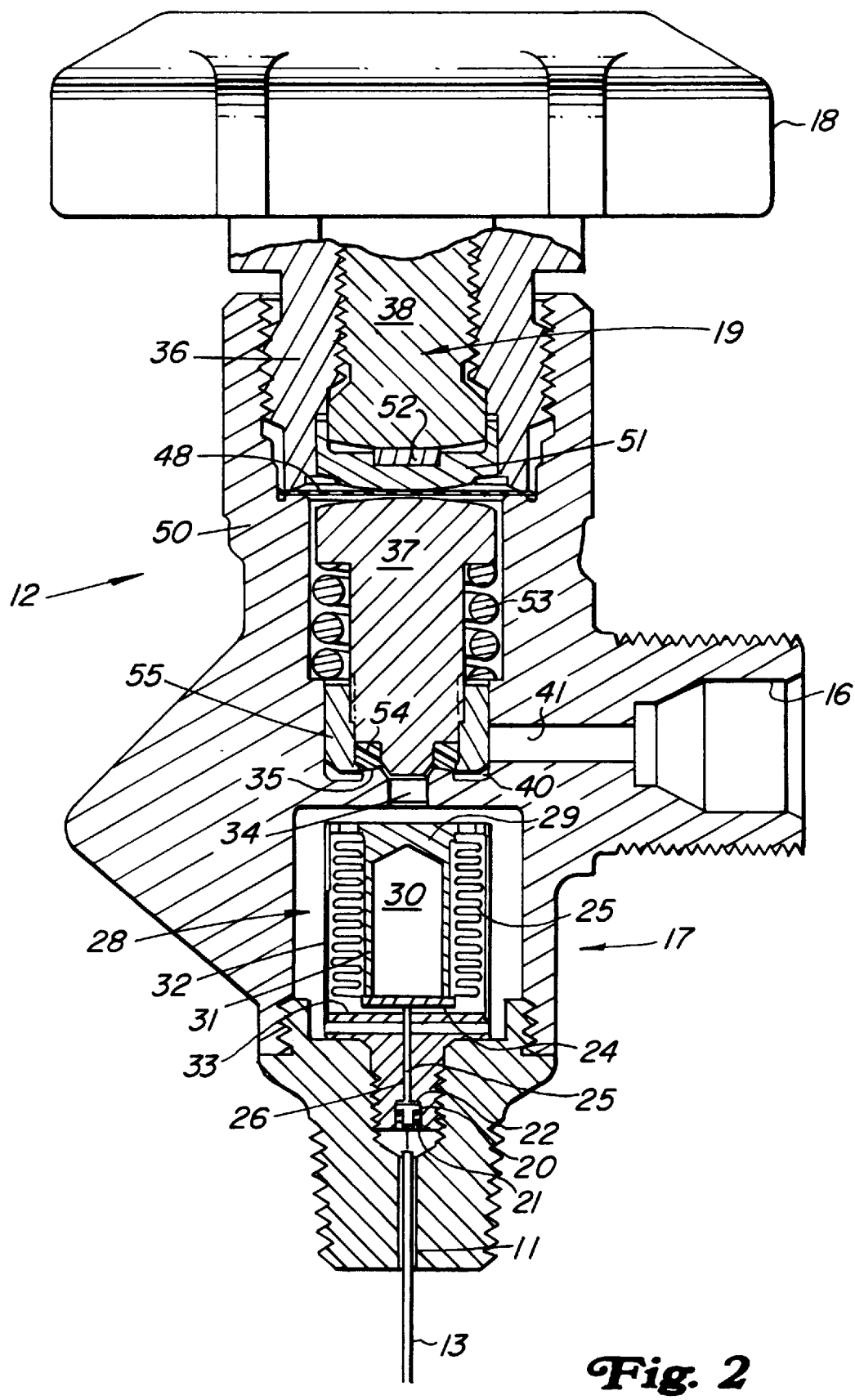
FIG. 2 is an enlarged view of the cylinder head assembly.

FIG. 2 shows regulator 17 and the internals of head valve 12 in more detail. Following then the path of the arsine gas out of head valve 12, the gas first enters through capillary tube 13 into valve inlet 11. The body of head valve 12 contains the regulator 17. Entering gas first contacts a valve element in the form of poppet 20. A spring 21 biases poppet valve 20 against a valve seat 22 to create a closed condition along the gas flow path. Spring 21 normally presses poppet valve 20 against valve seat 22 until the diaphragm element of the regulator, in the form of a bellows 23, expands to displace a contact plate 24. Contact plate 24 acts on a control pin 25 that pushes poppet 20 away from valve seat 22. Arsine gas may then flow through pin passage 26 around pin 25 and into a bellows chambers 27 that houses the bellows assembly 28.

Bellows assembly 28 consists of a bellows guide 29 that defines an internal pressure chamber 30 having walls 31 that support the inside of bellows 22; an outer sleeve 32 that surrounds the exterior of bellows 23; and a bottom guide plate 33. Sealing contact at the upper end of the bellows 23 with bellows guide 29 and at the lower end of the bellows with contact plate 24 isolate the bellow from pressure within chamber 27 and the gas flow path in general. Internal chamber 30 is typically sealed at atmospheric pressure such that a reduction in pressure within bellows chamber 27 causes the gases in bellows chamber 30 to expand bellows 23 and urge contact plate 24 downward against pin 25. Bellows guide 29 retains sleeve 32 about its outer edge. Sleeve 32 positions with guide plate 33. Together, bellows guide 29, sleeve 32 and guide plate 29 protectively enclose bellows 23. Pin 25 passes through a central hole in the guide plate 23 to maintain its alignment with contact plate 24.

Arsine gas that passes out of bellows chambers 27 flows through a valve inlet port 34 and across sealing surfaces 35. Threaded bushing 36 clamps a multi-layer metallic diaphragm 48 to valve body 50 thereby forming a positive seal against fluid leaking past the valve stem 38. Handle 18 operating in conjunction with threaded valve stem 38, forces piston 51 via friction pad 52 onto diaphragm 48 to move the main valve plunger 37 down against the resisting force of spring 53. Downward movement of plunger 37 forces a Teflon sealing element 54, retained by nut 55, onto valve body 50 to create a seal at surfaces 35. Backing valve stem 38 away from diaphragm 48 allows spring 53 to force valve plunger 37 up, thereby separating the sealing surfaces 35 and permitting gas to flow through port 34. Once past sealing surfaces 35 arsine gas flows from a chamber 40 to an outlet port 41 and to the valve outlet 16.

This regulator arrangement 17 can be set to reliably prevent opening of the poppet 20 until pressure within the valve body drops to a vacuum condition. This condition is usually equal to 500 torr or less. With this setting of the regulator, opening of the main valve, with or without the protective cap in place, would not dispense arsine from the cylinder. Since the typical end-user's apparatus operates at pressure less than 100 torr, dispensing arsine at a vacuum, and particularly at pressures of 500 torr of less, has several distinct advantages. For instance there is a negative pressure at all of the arsine gas connections, so leaks can only leak into the end-user apparatus where they are quickly detected by the apparatus itself. Thus, one does not have to check joint by joint to verify that there are no leaks. In addition no external pressure regulators are required for reducing the tank pressure to pressures acceptable to the mass flow controllers. More importantly, an accidental opening or failure of a pipe connection in the arsine system is orders of magnitude less hazardous in a vacuum operated system than in a pressure operated system.

The use of the restricted flow passage further increases safety in the unlikely event that regulator 17 fails to check gas flow when desired. Out of the previously mentioned restrictors, some form of capillary sized flow area offers the most flexibility and reliability as the flow restrictor. Whether provided by single or multiple small diameter bores or tightly packed materials, suitable restrictors of this type will desirably limit the transport of gas phase fluids to very low rates while permitting the flow of liquids at higher rates by capillary action. The restrictor will typically limit the discharge of fluid to not more than 10 sccm and more preferably to less than 3 sccm.

For example, a single bore capillary can limit atmospheric arsine release to about 3 sccm of arsine. Looking again at FIG. 1 to more fully explain this form of the flow restrictor, capillary tube 13 provides the only exit from cylinder 10. The winding formation of capillary 13 maintains inlet 14 near the axial and radial center of cylinder 10. The internal diameter of the capillary will ordinarily not exceed 0.02 millimeters (0.001 inch). This diameter limits the rate that the 250 psi saturation pressure of arsine can force arsine through the tube to only 60 milligrams per minute. Typical end-users require only 3 to 10 milligrams per minute (1 to 3 sccm). At the 60 milligram rate it would take 40 hours for the container to empty. It would take one hour for a 30 by 30 room with 10 foot ceilings to reach the arsine Immediate Danger To Life and Health (IDLH) level. One hour should provide ample time for alarms to warn personnel to exit and for response teams to take necessary action.

As mentioned, the length as well as the diameter of the capillary may be adjusted to provide a maximum desired flow rate through the restriction. In the case of arsine delivery at the previously mentioned rates, the capillary is typically 15 cm long with a bore of about 12 microns in diameter. If the diameter of the capillary is reduced to 9 microns while maintaining the same approximate length, it would require four capillaries in parallel to provide about the same flow capacity. Capillaries of this size may be made from various glass materials. Proper containment can overcome any fragility of glass.

Figure 3:
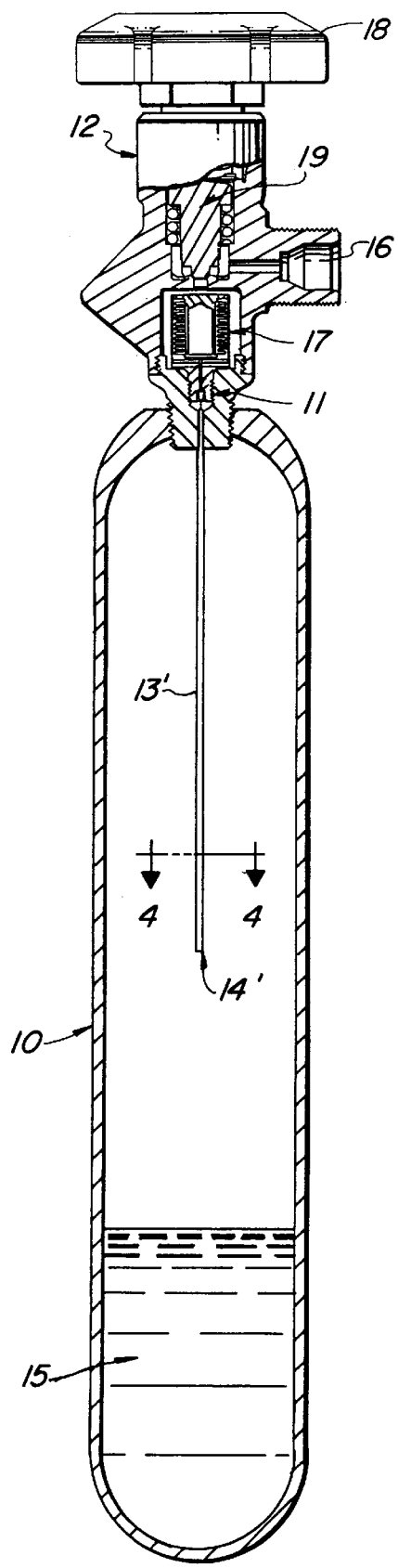
FIG. 3 is an alternate arrangement for the interior of the cylinder.
Figure 4:
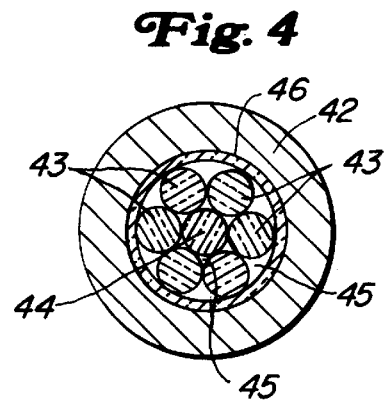
FIG. 4 is a section of FIG. 3 taken at lines 4—4.

A variety of suitable capillary structures may be created. FIG. 3 shows a tank that uses a modified form of a capillary defined by glass rods to provide a straight capillary arrangement 13' with its inlet 14' centered at the radial and axial midpoint of cylinder 10. As shown more clearly by the cross-sectional view in FIG. 4, a metal tube 42, typically constructed from stainless steel, protectively surrounds a glass tube 46. The inside diameter of tube 46 holds a hexagon arrangement of 6 solid glass rods 43 about a central glass rod 44 and the rods have about the same diameter. The spaces 45 between the rods 43 and rod 44 and between the rods 43 and the inside of tube 46 provide flow areas of capillary size for metering gas through the restricted openings of arrangement 13'. Shrinking glass tube over the glass rods 43 and 44 provides a rigid tube and rod assembly. Therefore even if the internal rods break, retention of the pieces by glass tube 46 will maintain a restricted flow area of capillary size through the internal diameter of glass tube 46. Metal tube 42 adds further rigidity and durability when optionally shrunk around glass rods 43 and 44 to provide a reinforced unit. With the optional reinforcement of metal tube 42, fracture of the glass rods or their surrounding glass tube would leave the function of the restricted flow path through capillary arrangement 13' substantially unchanged.

Where the capillary is the only entrance, arsine for filling the cylinder must enter through the capillary size opening. Cylinder filling normally requires the pumping of liquid arsine into the cylinders. Liquid arsine has a density about 500 times greater than gaseous arsine. Consequently for most liquid-fill, gas-withdrawal systems, filling will take orders of magnitude less time than the emptying of the cylinder.

In applications where fill time needs reduction, a larger port dedicated exclusively to cylinder filling may reduce times for recharging cylinders when desired or necessary for filling/delivery of other gas/gas or fluid/gas systems. In such arrangements the cylinder or valve may contain a separate entry port that by-passes the capillary or other flow restriction. Flow into the by-pass port may be controlled by a pressure, electrical or magnetic, or mechanical means to mention only a few possibilities.

It is also possible to fill the cylinder by using a displaceable restriction. Such a system is disclosed in copending U.S. Ser. No. 09/049,572. In this arrangement a filter element that can serve as restriction element reciprocates between different positions, one for filling the container and another for withdrawing gas from the container. In the case of a restrictor, it may be in the form of a sealing body wherein the sealing body is adapted for displacement away from the seal surface to establish a fluid flow path from the container that inhibits fluid flow through the valve body and for displacement toward the seal surface to establish a fluid flow path from the container to the valve outlet port that passes fluid through the restrictor and restricts fluid flow from container. In this manner a single port may be used to move fluid in and out of the container at automatically differing rates. The use of a single port through the tank inlet facilitates filling of the tank with gases by permitting the port to have a large flow area through the narrow neck of most container. A displaceable restrictor element may further incorporate valve sealing elements that move with the restrictor element to block any discharge of gas unless the restrictor is fully in contact with the seal surface.

What is claimed is:

1. An apparatus for controlling the discharge of pressurized fluids from the outlet of a pressurized tank containing toxic hydridic or halidic compounds, the apparatus comprising:

a container for holding a pressurized fluid in an at least partial gas phase;

an outlet port for releasing pressurized gas from the container;

a gas flow path defined at least in part by the outlet port for delivering pressurized gas from the container; and, a restrictor in the form of a restricted flow path along at least a portion of the gas flow path that limits the flow of the gas contained in the container to less than 10 sccm at atmospheric storage conditions.

2. The apparatus of claim 1 wherein a conduit located within the container defines the restricted portion of the flow path.

3. The apparatus of claim 2 wherein a packing in the conduit provides the restricted flow path.

4. The apparatus of claim 2 wherein the restriction conduit comprises a capillary tube having an internal diameter that does not exceed 0.2 mm.

5. The apparatus of claim 4 wherein the conduit defines an inlet located at about the axial midpoint of the container.

6. The apparatus of claim 5 wherein the conduit locates the inlet at about the radial midpoint of the container.

7. The apparatus of claim 2 wherein the conduit surrounds a plurality of elongate shafts to define a restricted flow area.

8. The apparatus of claim 7 wherein the shafts comprise straight, solid rods and have an arrangement of one central rod surrounded by six outer rods to provide capillary size flow areas in the spaces between the rods and the interior walls of the conduit.

9. The apparatus of claim 8 wherein the rods and conduit comprise glass and a protective sleeve surrounds the glass conduit.

10. A cylinder and a valve assembly for containing pressurized fluid and controlling the discharge of toxic hydridic or halidic compounds with pressurized fluids from the cylinder, the cylinder and valve assembly comprising:

a cylinder defining a cylinder opening;

a port body adapted for sealing engagement with the cylinder opening;

a fluid inlet port defined at least in part by the port body and located within the cylinder;

a fluid outlet port defined by the port body and located outside the cylinder;

a fluid discharge path defined by the valve body between the fluid inlet port and the fluid outlet port;

a manually operated shut off valve for controlling fluid flow along the fluid discharge path; and, a flow restriction along the fluid discharge path having an inside diameter of less than 0.2 mm for restricting the discharge of gas from the fluid outlet port to a mass flow rate of less than 5 sccm at atmospheric conditions.

11. The apparatus of claim 10 wherein the flow restriction comprises a restricted flow path.

12. The apparatus of claim 11 wherein the flow restriction comprises a capillary tube.

13. The apparatus of claim 12 wherein the capillary tube defines the fluid inlet port and locates the fluid inlet port about midway along the length of the cylinder and at about the radial mid-point of the cylinder.

14. The apparatus of claim 10 wherein the valve assembly comprises an automatic valve containing a valve element biased into a sealing position that blocks fluid flow along the fluid discharge path and a sealed bellows located downstream of the valve element along the fluid discharge path, the sealed bellows having one portion fixed with respect to the port body and another portion operably linked to the valve element to move the valve element to an open position when relative pressure between the interior and exterior of the bellows expands the bellows and wherein the open position permits fluid flow along the fluid discharge path.

15. The apparatus of claim 14 wherein the port body defines a bellows chamber that houses the bellows.

16. The apparatus of claim 15 wherein the bellows is adapted to move the valve element to an open position in response to a vacuum condition in the bellows chamber.

17. The apparatus of claim 16 wherein the valve element comprises a poppet valve.

18. An apparatus for controlling the liquid phase discharge of pressurized fluids from the outlet of a pressurized tank containing toxic hydridic or halidic compounds, the apparatus comprising:

a container for holding a pressurized fluid in a liquid phase and an at least partial gas phase;

an outlet port for releasing pressurized gas from the container;

a gas flow path defined at least in part by the outlet port for delivering pressurized gas from the container and a conduit defining an inlet located at about the axial mid-point of the container and at about the radial mid-point of the container; and, a restrictor in the form of a restricted flow path along at least a portion of the gas flow path.

19. The apparatus of claim 18 wherein the flow path with the restrictor limits the flow of the gas contained in the container to less than 10 sccm at atmospheric storage conditions.

20. The apparatus of claim 18 wherein the conduit comprises a tube having an internal diameter that does not exceed 0.2 mm.

* * * * *